United States Patent [19]
Zisman et al.

[11] Patent Number: 5,247,061
[45] Date of Patent: Sep. 21, 1993

[54] SYNTHESIS OF POLY(DITHIO THIADIAZOLE) BY OXIDATIVE POLYMERIZATION

[75] Inventors: Stan A. Zisman; Ralph P. Williams, both of Bartlesville, Okla.

[73] Assignee: Phillips Petroleum Company, Bartlesville, Okla.

[21] Appl. No.: 918,488

[22] Filed: Jul. 22, 1992

[51] Int. Cl.$^5$ .............................................. C08G 75/32
[52] U.S. Cl. .................................... 528/374; 526/257; 528/377; 528/493; 528/494; 528/495; 528/496; 528/499
[58] Field of Search ............... 528/374, 377, 493, 494, 528/495, 496, 499; 526/257

[56] References Cited

U.S. PATENT DOCUMENTS 4,107,059  8/1978  King et al. ........................... 252/28

FOREIGN PATENT DOCUMENTS 49-104784  9/1974  Japan .

OTHER PUBLICATIONS

Minoura et al., "Polymers Containing Thiadiazole Ring", Industrial Chemical Journal, vol. 70, No. 9, pp. 1573-1578 (1967).

E. Weisflog, "On the Synthesis of Alkylthio-, Cycloalkyl Thio- and Cycloalkyl Disulfides by the Oxidation of Mercaptothioethers, Bismercaptothioethers and Bismercaptoalkanes with Iodine and Triethylamine", Phosphorous and Sulfur and Related Elements, vol. 15, No. 1 (1983).

Encyclopedia of Polymer Science and Technology, vol. II, "Polysulfide Polymers", pp. 425-447 (1969).

Organic Chemistry, Ch. 6, "Role of the Solvent", pp. 223-247 (1987).

Standard Aqueous Electrode Potentials and Temperature Coefficients at 25° C. by de Bethune and Loud (1966).

*Primary Examiner*—Harold D. Anderson
*Attorney, Agent, or Firm*—Gary L. Haag

[57] ABSTRACT

This invention relates to the preparation of poly(dithio thiadiazole) by combining an oxidizing agent, a dithio thiadiazole, and an aprotic polar solvent thereby producing a polymer precipitant which may then be washed to remove residual contaminants.

17 Claims, No Drawings

SYNTHESIS OF POLY(DITHIO THIADIAZOLE) BY OXIDATIVE POLYMERIZATION

This invention relates to the preparation of disulfide polymers of dithio thiadiazole.

Disulfide polymers are used commercially because of their resistance to solvents, water, and ozone and their good weathering and low temperature performance characteristics.

Polysulfide polymers are generally prepared by the polycondensation of a dihalide monomer with sodium polysulfide in an aqueous solution. When some degree of crosslinking is desired, a trihaloalkane, such as trichloropropane is added. The polymerization is typically carried out in a suspension, rather than an emulsion. Standard practice is to feed the monomer reactant into an aqueous polysulfide solution which also contains appropriate suspending agents (ex., alkyl naphthalenesulfonate with magnesium hydroxide sol prepared in situ). The heavy polymer product is then washed from the course suspension and recovered by decantation.

Minoura et al. ("Polymers Containing Thiadiazole Ring", Industrial Chemical Journal, Vol. 70, No. 9, pp. 1573-1578 (1967)) teaches an oxidative synthesis of a poly(2,5-dithio-1,3,4-thiadiazole) by the batch reaction of 2,5-dimercapto-1,3,4-thiadiazole in either acetone or glacial acetic acid solvent (0.50 moles reactant/liter solvent) by the addition of an oxidizing agent, aqueous hydrogen peroxide, at 23° C. The polymer precipitant is then filtered, washed with methanol and dried. Minoura et al. also teaches the oxidative synthesis of said polymer by the batch reaction of 2,5-dimercapto-1,3,4-thiadiazole in either aqueous sodium hydroxide or ethanol solvents wherein elemental iodine is used as the oxidation agent. The polymer precipitant for these solvents is also filtered, washed with sodium thiosulfate solution, methanol and dried.

The system wherein acetone was the solvent and hydrogen peroxide was the oxidizing agent provided the greatest yields, typically greater than 95%, and a polymer melting point of 160° to 171° C. For a given sample, the uncertainty or spread in polymer melting point was 4° to 8° C. The aqueous sodium hydroxide/elemental iodine system provided the poorest yields. Although the reported yields were only 37.7 to 41.5%, the polymer product possessed a higher melting point, 174° to 180° C., and the uncertainty or spread in the melting point was reduced to about 3° to 5° C. The hydrogen peroxide oxidant/glacial acetic acid solvent system resulted in yields of 40.6 to 87.4% and the polymer melting point varied from 165° to 178° C. with an uncertainty of about 4°-5° C. For the iodine oxidant/ethanol solvent system, reported yields were 67.4 to 76.5% and the polymer melting point varied from 159° to 164° C. with an uncertainty of about 4° C.

King et al. (U.S. Pat. No. 4,107,059) teaches the preparation of poly(2,5-dithio-1,3,4-thiadiazole) precipitant in an aqueous system by the reaction of the disodium salt of 1,3,4-thiadiazole-2,5-dithiolate (1.0 mole/liter-water) with ammonium persulfate (1.1 moles/250 ml-water) at 21°-24° C. for 1.75 hours, thereby forming a polymer precipitant. (The reactant, the disodium salt 1,3,4-thiadiazole-2,5-dithiolate was prepared by the reaction of aqueous hydrazine sulfate, carbon disulfide, and aqueous sodium hydroxide.) The polymer precipitant is filtered, washed with water, acidified with dilute hydrochloric acid to a pH of 2, washed with water, and dried in a vacuum dessicator over sodium hydroxide. A 94% yield of yellow solids possessing a 177°-184° C. melting is reported.

King also teaches the synthesis of poly(3,5-dithio-1,2,4-thiadiazole) by essentially the same procedure, except the starting monomer is a potassium salt rather than a sodium salt. An 85% yield of a yellow product possessing a melting point greater than 300° C. is reported.

SUMMARY OF THE INVENTION

It is an object of this invention to provide a method for producing high purity poly(dithio thiadiazole).

It is a further object of this invention to provide a method of producing a poly(dithio thiadiazole) in high yield.

Yet a further object of this invention is to provide a method for producing a poly(dithio thiadiazole) which possesses a narrow melting point temperature.

A still further object of this invention is to provide a method for producing a poly(dithio thiadiazole) which is economical.

And yet a further object of this invention is to provide a method for producing poly(thio thiadiazole) which is operationally simple.

And yet a still further object of this invention is to provide a method of producing poly(dithio thiadiazole) which may be easily scaled to the preparation of larger quantities of disulfide polymer.

In accordance with this invention, poly(dithio thiadiazole) is prepared by combining an oxidizing agent, a dithio thiadiazole, and an aprotic polar solvent thereby producing a polymer precipitant which may then be washed to remove residual contaminants.

DETAILED DESCRIPTION OF THE INVENTION

This inventive process for the preparation of poly(dithio thiadiazole) polymer nominally requires reacting a dithio thiadiazole with an appropriate oxidizing agent in the appropriate solvent to form a crude polymer precipitant. The addition of a separate catalytic species is not required. A purified polymer may then be obtained by treating the crude polymer precipitant to remove residual contaminants.

The crude polymer precipitant is prepared by the oxidative polymerization of dithio thiadiazole monomer with an appropriately selected oxidation agent in the presence of an aprotic polar solvent. As previously noted, the addition of a separate catalytic species is not required. The reaction, when using the most preferred monomer, 2,5-dithio-1,3,4-thiadiazole, and the most preferred oxidizing agent, sulfuryl chloride, can generally be depicted by the following stoichiometry:

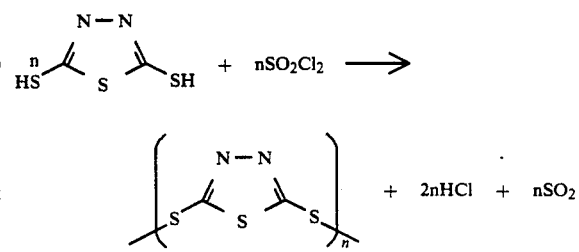

The polymerization process is broadly applicable to the polymerization of dithio thiadiazole monomers or mixtures thereof and most preferably, polymerization of 2,5-dithio-1,3,4-thiadiazole monomer.

A key factor in the development of this inventive process was the recognition that the solvent must possess aprotic polar properties. Aprotic polar solvents dissolve ionic compounds through the solvation of cations as opposed to protic polar solvents such as water and alcohol which dissolve ionic compounds through the solvation of cations and particularly, the solvation of anions by hydrogen bonding with the acidic hydrogen. If the aprotic polar solvent is noncyclic, it is preferable that it contain at least 4 carbon atoms and more preferably 5 to 8 so as to enhance lipophilic properties. Preferably, the aprotic polar solvent is an aprotic heterocyclic-bearing polar solvent wherein the heterocyclic- and alkyl- and aryl- substituted heterocyclic molecules possess at least one ring structure wherein at least one ring member is a polar atom (ex., nitrogen, sulfur, oxygen) and said molecules exhibit appreciable lipophilic properties but little or no tendency to exhibit properties characteristic of hydrogen bonding. More preferably, the aprotic heterocyclic solvent meets the preceding requirements and is further restricted to possessing at least one five-membered ring which contains said polar atom. Examples include but are not restricted to furan, thiophene, oxazole, thiazole, quinoline, tetrahydrofuran, and sulfolane. When using the preferred sulfuryl chloride as the oxidizing agent for the polymerization of 2,5-dimercapto-1,3,4-thiadiazole, tetrahydrofuran is the preferred solvent.

Although wishing not to be bound by theory, results indicate that an aprotic polar solvent apparently solubilizes the monomer reactant in such a manner as to leave the sulfur atoms, which are highly electronegative, in an exposed and more highly reactive condition with regard to subsequent polymerization. The solvent may also become part of a reaction intermediate. This solvation apparently enables the use of weaker oxidizing agents such as sulfuryl chloride. The lipophilic properties of the solvent apparently enhances the solubilization of the non-polar portion of the reactant and furthermore, provides excellent solubilization of residual oils which may accompany the commercially available reactant in concentrations of up to 3%. On polymerization, the polymer is removed from the reaction medium as a precipitant whereas the oily impurities remain solubilized in the solvent.

The amount of solvent, the operating temperature, and the rate of addition of the oxidizing agent to the reaction medium are to a great extent at the discretion of one skilled in the art and dependent upon the available process equipment and the mode of operation, batch or continuous. Solvent is required in an amount effective to insure complete solubilization of the reactant and accompanying oily impurities before polymerization, sufficient polymer solubilization during the polymerization process, and to maintain the oily impurities in solution following precipitation of the polymer product. A monomer to solvent molar ratio of about 0.01:1 to about 1:1 is preferred, about 0.01:1 to about 0.5:1 more preferred and about 0.1:1.0 most preferred.

Appropriate oxidation agents are those oxidizing agents exhibiting reduction potentials similar to or less than hydrogen peroxide. The reduction potential of prospective oxidation agents can be quantified by their respective Standard Reduction Potentials. The Standard Reduction Potential (SRP) is the voltage potential attributed to the oxidation reaction of interest occurring at the cathode of a voltaic cell operated at standard conditions. Standard Conditions are usually defined as 25° C. and unit activity which is (1) the standard reference state for solids and liquids, (2) a concentration of 1M for molecules and ions in solution, and (3) partial pressures of 1 atm for gases. The reduction potential is proportional on an electron basis to the thermodynamic change in Gibbs Free Energy for the transfer of electrons and is therefore, a measurement of the useful work which can be extracted on a per electron basis from the reaction occurring within the cell or the work which can be exerted to oxidize a given component on a per electron basis. Presented in Table 1 are Standard Reduction Potentials for the designated half reactions. When the half reaction occurring at the anode is the oxidation of $H_2$ to $2H^+$, the potential in Table I is also that for the entire redox reaction. For oxidative polymerization, the hypothetical half reaction occurring at the anode may be represented by the reaction of 2 monomers.

$$2HRH \rightarrow H\text{-}R\text{-}R\text{-}H + 2e^- + 2H^+$$

The oxidation potential for the preceding half reaction is independent of the oxidation agent chosen. The Table I tabulation is not intended to be inclusive of all oxidation agents herein claimed.

Although the Standard Reduction Potential provides a basis for comparing the oxidation strength of various oxidizing agents at Standard Conditions, the oxidation strength or chemical work available on a per electron basis is frequently desired at other than Standard Conditions. Generally, the reduction potential is not a strong function of temperature and the effect of operating at partial pressures significantly deviating from 1 atm can be accounted for by one skilled in the art. The reduction potential when species concentration in the solvent are other than 1M can be calculated from the Nerst equation for the reaction represented by

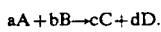

$$aA + bB \rightarrow cC + dD.$$

The correction is represented by $$E = E^\circ - \frac{0.059}{n} \log_{10} \frac{[C]^c [D]^d}{[A]^a [B]^b}$$

where
E = Cell voltage in volts,
E° = Cell voltage in volts at Standard Conditions,
n = Number of electrons transfer in the reaction,
[A], [B], [C], [D] = molar concentration of species A, B, C and D and
a, b, c, d = stoichiometric coefficients.

For the reaction stoichiometry represented by

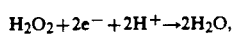

$$H_2O_2 + 2e^- + 2H^+ \rightarrow 2H_2O,$$

the Nerst equation shows that the reduction potential will be dependent on the concentration of the hydrogen peroxide oxidizing agent and the hydrogen ion concentration or pH of the solution. At the acid conditions of Table I where the [H+] concentration is 1M, the pH is 1 and the SRP is 1.77 V. At a neutral pH [$10^{-7}$M H+], the reduction potential is reduced to 1.36 V and at a basic pH of 14 [$10^{-14}$M H+ or 1M OH−], the reduction potential is about 0.94 V. As shown by the Nerst equation, the reduction potential is also dependent on the concentration of the oxidizing agent. Because oxidizing agents are generally present at excess concentrations to insure complete reaction of the reactant to be oxidized, corrections for deviations from Standard Conditions (i.e., 1M) are generally small.

An oxidation agent possessing a reduction potential less than or equivalent to that of $H_2O_2$ at Standard Conditions (i.e., SRP=1.77) is preferred. If the oxidation agent is present in a solvent, the preferred solvent is an aprotic polar solvent. However, if the oxidizing is present in a protic polar solvent, it is preferred that the oxidizing agent be in a concentrated form so as to minimize the potential for reduced yields and contamination of the monomer-bearing aprotic polar solvent by protic polar solvent. One preferred group of oxidizing agents which subject to the constraints of the Nerst equation can possess reduction potentials of 1.77 V or less are the oxyacids of chlorine, bromine, and iodine and the salts thereof. Oxyacids include hypohalous acids represented by HOX, halous acid represented by $HXO_2$, halic acid represented by $HXO_3$, and perhalic acid represented by $HXO_4$ where X is chlorine, bromine, or iodine; H is hydrogen; and O is oxygen. Of this group, the more preferred oxyacids are the oxyacids of chlorine and the salts thereof. A more preferred group of oxidizing agents are those which possess a reduction potential of less than 1.77 and do not require dissolution in a protic polar solvent. These oxidizing agents specifically include chlorine, bromine, oxygen, iodine, and sulfuryl chloride. Still more preferred of this group are chlorine, bromine, iodine and sulfuryl chloride because the associated reduction half reactions are not directly dependent on system pH (i.e., hydrogen ion concentration). Chlorine and sulfuryl chloride are particularly preferred because of the operational experience with $Cl^-$ as a reaction product from the polymerization reaction. Sulfuryl chloride, being a liquid, is most preferred because of operational experience, the ease of handling and the characteristics of the final polymer product.

The oxidative polymerization reaction is kinetically favored and exothermic. Therefore, the rate of addition of the oxidizing agent is dependent on the process cooling capabilities which are dependent on the process temperature, process equipment and mode of operation. For a given solvent, the preferred temperature is less than or about the atmospheric boiling point of the solvent. From a practical perspective, operation at temperatures significantly above the atmospheric boiling point is disfavored because of the increased expense in using process equipment capable of operation at positive pressures. Furthermore, the cited solvents are generally flammable and operation at conditions of lower volatility (i.e., lower temperature) are favored from an operational and safety perspective. The preferred lower temperature limits for process operation are dependent on the physical properties of the resulting reaction medium, most notably viscosity. It is preferred that sufficient fluidity exist in the reaction medium such that the mixture can be easily mixed during the polymerization reaction and the precipitant product easily separated following the reaction. From an operational perspective, operation at temperatures greater than 0° C. is preferred and a temperature range of 0° to 100° C. more preferred. When using the preferred solvent, tetrahydrofuran, operation at 0° to 70° C. is preferred, 0° to 50° C. is more preferred, and 5° to 45° C. is most preferred.

Oxidizing agent is required in an amount effective to bring about significant polymerization and said term is inclusive of any associated solvent. As previously noted, the exothermic nature of polymerization reaction requires that the oxidizing agent be added to the reaction medium in a controlled manner using the expertise of one skilled in the art. The oxidizing agent should preferably be in an amount effective to insure that stoichiometric requirements for the polymerization reaction are met. When using sulfuryl chloride as the oxidizing agent, the preferred molar ratio of sulfuryl chloride to monomer is about 0.5:1 to about 2.0:1, more preferred is about 1.0:1 to about 1.50:1, still more preferred about 1.00:1 to about 1.25:1, and most preferred is at least 1.0:1 to about 1.05:1. The latter ratios are preferred so as to minimize recycling and/or waste disposal of unreacted oxidant.

The second step is the treatment of the crude polymer precipitant to remove residual contaminants. The crude polymer precipitant is first separated from the reaction medium using any of the many solid/liquid separation techniques available to one skilled in the art. Filtration is preferred. Recovered solid product is then washed one or more times with a polar fluid. The resulting washed polymer product is then recovered, preferably by filtration, and dried. Preferred polar fluids are tetrahydrofuran, water, acetone, and methanol or mixtures thereof. The most preferred wash procedure is the sequential contacting of the precipitant with tetrahydrofuran and hot water, preferably at a temperature greater than 85° C. The required amount of wash fluid is that amount effective to remove residual contaminants. In one preferred mode, the recovered solid is washed first with tetrahydrofuran and then boiling water in the respective volume to product weight ratios of about 2.0:1 milliliters per gram precipitant and about 5.3:1 milliliters per gram precipitant.

The washed polymer is dried in a manner effective to remove the final washed fluid. Methods of drying include but are not limited to vacuum drying, inert gas purging, drying at an elevated temperature, vacuum drying at an elevated temperature and inert gas purging conducted at an elevated temperature. When using methanol as the final wash fluid, one preferred technique is vacuum drying at about 1 torr pressure and about 80° C.

EXAMPLE I

This Example demonstrates the laboratory preparation of poly(2,5-dimercapto-1,3,4-thiadiazole) polymer in high yield using sulfuryl chloride as the oxidation agent and tetrahydrofuran as the aprotic polar solvent.

Using the preferred techniques, wash product (see Example I) yield and said product possessed a melting point of 175° to 176° C. These results in combination are superior to the prior art previously cited.

A 1000 mL, three necked, round bottomed flask was equipped with a claisen adapter (complete with reflux condenser with $N_2$ inlet), addition funnel, magnetic stirrer and thermocouple. The flask was charged with 2,5-dimercapto-1,3,4-thiadiazole (80 g, 0.53 moles) and tetrahydrofuran (400 mL, 4.93 moles) and then stirring was initiated. After purging the system with $N_2$, sulfuryl chloride (72 g, 0.53 moles) was added dropwise at room temperature to the solution over 2 h (during this period, the resulting exotherm raised the temperature to ~42° C.). A yellow precipitate formed instantly and the resulting slurry was stirred an additional hour. The mixture was filtered, washed with THF (150 mL) and boiling water (400 mL), respectively, and the resulting solid dried at 1 torr pressure and 80° C. for 8 hours to produce a fine light yellow solid (74.6 g). The product yield was 95% and the product melting point was 175°–176° C. The infrared absorbance spectrum using KBr windows showed significant absorbance at 1377 and 1042 cm$^{-1}$.

TABLE I

Standard Reduction Potentials for Designated Half-Reactions at 25° C. and Unit Activities in Acid Solutions

| Half Reaction | | Standard Reduction |
|---|---|---|
| Reactant | Product | Potential (Volts)[a] |
| $F_2(g) + 2e^-$ | $2F^-$ | 2.87 |
| $O_3 + 2H^+ + 2e^-$ | $O_2 + H_2O$ | 2.07 |
| $S_2O_8^{-2} + 2e^-$ | $2SO_4^{-2}$ | 2.01 |
| $H_2O_2 + 2H^+ + 2e^-$ | $2H_2O$ | 1.77 |
| $MnO_4^- + 8H^+ + 5e^-$ | $Mn^{+2} + 4H_2O$ | 1.52 |
| $ClO_2 + 4H^+ + 5e^-$ | $Cl^- + 2H_2O$ | 1.50 |
| $ClO_3^- + 6H^+ + 5e^-$ | $\frac{1}{2}Cl_2(g) + 3H_2O$ | 1.47 |
| $ClO_3^- + 6H^+ + 6e^-$ | $Cl^- + 3H_2O$ | 1.45 |
| $ClO_4^- + 8H^+ + 8e^-$ | $Cl^- + 8H_2O$ | 1.38 |
| $Cl_2(g) + 2e^-$ | $2Cl^-$ | 1.36 |
| $Cr_2O_7^{-2} + 14H^+ + 6e^-$ | $2Cr^{+3} + 7H_2O$ | 1.33 |
| $SO_2Cl_2(l) + 2e^-$ | $SO_2(g) + 2Cl^-$ | 1.29[b] |
| $MnO_2(s) + 4H^+ + 2e^-$ | $Mn^{+2} + 2H_2O$ | 1.23 |
| $O_2(g) + 4H^+ + 4e^-$ | $2H_2O$ | 1.23 |
| $Br_2(l) + 2e^-$ | $2Br^-$ | 1.07 |
| $I_2(s) + 2e^-$ | $2I^-$ | 0.53 |
| $SO_4^{-2} + 4H^+ + 2e^-$ | $SO_2(g) + 2H_2O$ | 0.20 |
| $S(s) + 2H^+ + 2e^-$ | $H_2S$ | 0.14 |
| $2H^+ + 2e^-$ | $H_2(g)$ | 0.00 |

[a]All values are literature values, except where noted. Values taken from Standard Aqueous Electrode Potentials and Temperature Coefficients at 25° C., A. J. de Bethune and N. A. S. Loud, published by Clifford A. Hampel, Skokie, Ill. (1964) or Modern Inorganic Chemistry, J. J. Lagowski, Marcel Dekker, Inc. New York (1973), p. 545.
[b]Calculated by Applicant using published thermodynamic data.

EXAMPLE II

This Example demonstrates the large scale preparation of poly(2,5-dimercapto-1,3,4-thiadiazole) polymer using a procedure similar to the laboratory procedure presented in Example I.

To a 300 gallon glass-lined Pfaudler reactor, 129 lbs of 2,5-dimercapto-1,3,4-thiodiazole (DMTD) was added. The DMTD is a fine yellow powder which resembles sulfur. To the solids in the reactor, a total of 600 lbs of tetrahydrofuran (THF) was added. The agitator was then turned on and the solids were easily suspended using a single speed anchor-type agitator. The solids quickly dissolved thereby forming an amber-colored liquid. The vapor off-gas line was then opened to another reactor which contained a 12% sodium hydroxide solution which neutralized the hydrochloric acid fumes released during the oxidative polymerization reaction.

The polymerization reaction was conducted by adding 116 lbs of sulfuryl chloride ($SO_2Cl_2$) to the THF/DMDT solution which was continuously stirred. The addition was conducted in 10 lb increments so as to avoid the rapid release of gaseous HCl and significant increases in process temperature. The addition took approximately 90 minutes to complete. Although the reactor was continuously cooled during the sulfuryl chloride addition, the temperature was observed to rise from 19° to 34° C. and some evolution of HCl reaction product from the reaction mixture was observed.

The addition of the sulfuryl chloride immediately resulted in a yellow solid precipitate. After completion of the sulfuryl chloride addition, the resulting slurry was stirred an additional hour at 30° C. The slurry in the reactor was then allowed to settle for an hour whereupon the liquid phase was removed by pulling a vacuum on a 100 gallon reactor to which was connected a decant wand. A cloth filter was placed over the end of the decant wand and the wand was submerged into the solid precipitant for liquid removal. Because a significant portion of the hydrochloric acid and sulfur dioxide reaction products remained in the liquid, the pH of the removed liquid was approximately 0. This decanted fluid was neutralized with 50% sodium hydroxide and transferred to waste drums.

The solids remaining in the 300 gallon reactor were then washed with 90 gallons of water. This mixture was stirred for fifteen minutes and then allowed to settle for thirty minutes. The liquid was then removed as before, neutralized and drained to a waste tank. Approximately ten water washes were required to obtain a washed fluid of pH 5.5 or greater.

The solids remaining in the 300 gallon reactor were then contacted with one drum of THF and the solids filtered using a Knutesch-type filter equipped with a 20 micron paper filter. The liquid was neutralized and drained to waste tanks.

Ninety gallons of water were then added to the 300 gallon reactor, heated to 90° C., and flowed through the filter thereby additionally washing the filter cake. The wash water was then neutralized and drained to waste tanks. The filter cake was removed, washed in fifteen gallons of water, and then dried in a vacuum dryer.

The quality of the material prepared using the above procedure was comparable to the material obtained at the laboratory scale (see Example I). The melting point for the above material was 174° to 176° C., whereas the melting point for the laboratory prepared material was 175° to 176° C. The carbon-hydrogen-nitrogen-sulfur (CHNS) ratios and the metals content of the final product were similar to those obtained for the laboratory-prepared material. The product yields for two batches prepared using the above procedure were 42.4 and 61.5% versus 95.0% for the laboratory-prepared material. The lower yields were attributed to mechanical losses associated with the multiple wash and decant steps which were not optimized. Technique improvement resulted in a nearly 20% increase in yield between the first and second batches.

That which is claimed is:

1. A process for making poly(dithio thiadiazole) comprising:
   combining an oxidizing agent possessing a reduction potential of 1.77 V or less, dithiol thiadiazole monomer selected from the group consisting of 2,5-dithio-1,3,4-thiadizaole, 3,5-dithio-1,2,4-thiadiazole, 3,4-dithio-1,2,5-thiadiazole, 4,5-dithio-1,2,3-thiadiazole and mixtures thereof, and an aprotic polar solvent selected from the group consisting of non-cyclic aprotic polar solvents containing at least 4 carbon atoms and heterocyclic aprotic polar solvents, thereby forming a crude polymer precipitant and a depleted reaction medium.

2. A process according to claim 1, additionally comprising the steps of:
   (a) separating said crude polymer precipitant from said depleted reaction medium; and
   (b) washing said separated crude polymer product to obtain a purified disulfide polymer.

3. A process according to claim 2, wherein said washing of crude polymer product consists of washing said separated crude polymer precipitant one or more times with one or more polar fluids to obtain said purified disulfide polymer.

4. A process according to claim 1, wherein said solvent is an aprotic heterocyclic polar solvent.

5. A process according to claim 1, wherein said oxidizing agent is selected from the group consisting of the oxyacids of chlorine, bromine, and iodine and the salts thereof.

6. A process according to claim 1, wherein said oxidizing agent is selected from groups consisting of the hypohalous acids, the halous acid, the halic, and the perhalic acid of chlorine and the salts thereof.

7. A process according to claim 1, wherein said oxidizing agent is selected from the group consisting of chlorine, bromine, oxygen, iodine, and sulfuryl chloride.

8. A process according to claim 7, wherein said oxidizing agent is sulfuryl chloride.

9. A process according to claim 1, wherein said solvent is tetrahydrofuran.

10. A process according to claim 9, wherein said monomer is 2,5-dithio-1,3,4-diathiazole.

11. A process according to claim 1, wherein said combining consists of first combining said monomer and said solvent to form a monomer-solvent mixture followed by adding in a controlled manner said oxidizing agent to said mixture.

12. A process according to claim 3, further comprising maintaining a process temperature of about 0° to about 70° C.

13. A process according to claim 3, wherein said washing is conducted with polar fluids selected from the group consisting of tetrahydrofuran, water, acetone, methanol and mixtures thereof.

14. A process according to claim 3, wherein said separation is performed by filtering.

15. A process according to claim 3, further comprising the step of:
   (d) drying said purified disulfide polymer to obtain a dried purified disulfide polymer.

16. A process for making poly(2,5-dithio-1,3,4-thiadiazole) comprising the steps of
   (a) combining sulfuryl chloride, 2,5-dithio-1,3,4-thiadiazole, and tetrahydrofuran, thereby forming a crude polymer precipitant and a depleted reaction medium:
   (b) separating said crude polymer precipitant from said depleted reaction medium; and
   (c) washing said separated crude polymer with polar fluids selected from the group consisting of tetrahydrofuran, water, acetone, methanol and mixtures thereof to obtain a purified disulfide polymer.

17. A process for making poly(dithio thiadiazole) comprising the steps of:
   (a) combining a dithio thiadiazole monomer selected from the group consisting of 2,5-dithio-1,3,4-thiadiazole, 3,5-dithio-1,2,4-thiadiazole, 3,4-dithio-1,2,5-thiadiazole, 4,5-dithio-1,2,3-thiadiazole, and mixtures thereof and an aprotic polar solvent selected from the group consisting of non-cyclic aprotic polar solvents containing at least 4 carbon atoms and heterocyclic aprotic polar solvents, thereby forming a monomer-bearing solution; and
   (b) combining said monomer-bearing solution with an oxidizing agent possessing a reduction potential of 1.77 V or less thereby forming a crude polymer precipitant and a depleted reaction medium.

* * * * *

UNITED STATES PATENT AND TRADEMARK OFFICE
CERTIFICATE OF CORRECTION

PATENT NO.   : 5,247,061

DATED        : September 21, 1993

INVENTOR(S)  : Stan A. Zisman and Ralph P. Williams

It is certified that error appears in the above-identified patent and that said Letters Patent is hereby corrected as shown below:

Column 9, line 25, "2,5-dithio-1,3,4-diathiazole" should be
---2,5-dithio-1,3,4-thiadiazole---.

Signed and Sealed this

Twenty-second Day of March, 1994

Attest:

BRUCE LEHMAN

Attesting Officer      Commissioner of Patents and Trademarks